(12) United States Patent
Katzenbeisser et al.

(10) Patent No.: US 8,627,103 B2
(45) Date of Patent: Jan. 7, 2014

(54) IDENTITY-BASED ENCRYPTION OF DATA ITEMS FOR SECURE ACCESS THERETO

(75) Inventors: Stefan Katzenbeisser, Darmstadt (DE); Milan Petkovic, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 143 days.

(21) Appl. No.: 12/992,314

(22) PCT Filed: May 18, 2009

(86) PCT No.: PCT/IB2009/052060
§ 371 (c)(1),
(2), (4) Date: Nov. 12, 2010

(87) PCT Pub. No.: WO2009/141784
PCT Pub. Date: Nov. 26, 2009

(65) Prior Publication Data
US 2011/0066863 A1 Mar. 17, 2011

(30) Foreign Application Priority Data
May 23, 2008 (EP) .................................... 08156783

(51) Int. Cl.
*G06F 11/30* (2006.01)
(52) U.S. Cl.
USPC .......................................................... 713/189
(58) Field of Classification Search
USPC .......................................................... 713/189
See application file for complete search history.

(56) References Cited

U.S. PATENT DOCUMENTS

| 5,850,444 | A  | * | 12/1998 | Rune | 705/79 |
| 6,226,618 | B1 | * | 5/2001  | Downs et al. | 705/51 |
| 7,113,594 | B2 | * | 9/2006  | Boneh et al. | 380/28 |
| 2002/0010679 | A1 | | 1/2002 | Felsher | |

FOREIGN PATENT DOCUMENTS

| EP | 1372055 A2 | 12/2003 |
| GB | 2400699 A | 10/2004 |
| JP | 2005332241 A | 12/2005 |
| WO | 2004095770 A1 | 11/2004 |
| WO | 2005050415 A1 | 6/2005 |

OTHER PUBLICATIONS

Machine translation of JP 2005332241 from the http://dossier1.ipdl.inpit.go.jp web page.*
Boneh et al: "Identity-Based Encryption From the Weil Pairing"; SIAM Journal of Computing, 2003, Vol. 32, No. 3, pp. 586-615.
International Search Report—PCT/IB2009/052060.

* cited by examiner

*Primary Examiner* — Jacob Lipman

(57) ABSTRACT

The invention uses the concept of identity-based encryption in the context of data-centric protection of electronic health records, where each data item is encrypted by using its own identifier as a public key. The corresponding decryption keys are managed by special trusted entities, which distribute the keys to authorized parties and provide logging facilities. This approach has the particular advantage that emergency access mechanisms can be implemented in a secure and extremely efficient way. In contrast to previous approaches, it requires no large-scale distribution of secret decryption keys. Furthermore, the scheme allows limiting the impact of a compromised decryption key, as one key can only be used to decrypt one single document.

20 Claims, 2 Drawing Sheets

IDENTITY-BASED ENCRYPTION OF DATA ITEMS FOR SECURE ACCESS THERETO

FIELD OF THE INVENTION

The present invention relates to digital rights management (DRM) in general and in particular to encryption and decryption of data items and the grant of access to encrypted data items.

BACKGROUND OF THE INVENTION

Advances in information and communication technologies bring with all their benefits also concerns with respect to security issues. Data no longer reside on mainframes physically isolated and located within an organization, where physical security measures can be taken to defend the data and the system. Modern solutions are heading towards open, interconnected environment where storage outsourcing and operations on untrusted servers happen frequently. The old server-centric protection model locks the data in a database server and uses a traditional access control model to permit access to data. To resolve this security problem, which is emphasized in the field of enterprise data management systems, grid computing, or other distributed/peer-to-peer data management systems, a data-centric protection (DRM-like) model is proposed where data is cryptographically protected and allowed to be outsourced or even freely float on the network. Rather than relying on different networks to provide the confidentiality, integrity and authenticity of data, insecure networks are assumed and data is protected at the end points of communication channel. Data will be encrypted and only authorized users which need to access the data will receive the decryption keys which in turn will allow them to decrypt the data. The DRM system ensures end-to-end confidentiality which from security point of view is a great improvement regarding control over data distribution and privacy of the different users, in particular in the medical healthcare world.

In healthcare, however, access to data is very often given on an ad-hoc basis, e.g. in emergency situations. For the above describe solution to be accepted by the medical world, it is imperative to include an emergency access possibility: the life of patients sometimes depends on the ability of care providers to access data. Even if security is an important feature, it is still less important than patient's safety. Any healthcare provider that is treating a patient must get access to the relevant data. In the data-centric protection models, this means he needs the keys that are used for encrypting the data. A previously suggested solution is based on the use of a trusted agent which releases data keys for medical data in the emergency cases.

Normally, published DRM-protected data is encrypted and a License Server only issues licenses, i.e. decryption keys, to requesting users if they have enough rights for accessing the data. An emergency access is therefore difficult to handle in the sense that it represents an exception in the normal behavior of the system: the emergency care provider should be granted a license for decoding the data he wants to access even if he has no normal legitimate right on it. Legitimateness of access must consequently be proved later such that data privacy is eventually still ensured. Logging of emergency accesses is then required.

In a previously suggested solution the emergency access control problem is how to issue emergency licenses and log such events. An infrastructure of trusted agents is deployed to issue an emergency license upon a request for emergency access. A new trusted and available component responsible for handling emergency situations, still enforcing data secrecy, is therefore needed. It will in fact consist of a parallel infrastructure that can be deployed at the same time as an existing DRM system.

The emergency authority generates new emergency key pairs which are transmitted to all its emergency agents. In addition to that, only the public keys are sent to license servers, such that they can create emergency licenses for newly protected data. In addition to encrypting the content key the intended user's public key, the license sever will encrypt the content key also with emergency key. All the private emergency keys must be known by every emergency agent such that data availability is ensured.

However, the solution described above has several problems. First of all, if one of the emergency keys is compromised, a number of data items are affected, i.e. they are compromised too. In order to reduce the consequences the number of emergency keys could be increased (till using one emergency key per data item), which will consequently increase the number of keys the trusted agents have to manage and store (up to a key per data item). Obviously, this approach does not scale.

Another problem is that at the time of establishing data protection and creation of emergency license the (supposedly secret) emergency key has to be known.

Hence, an improved and simplified method for managing encrypted data items would be advantageous, and in particular a more simplified and/or reliable method of issuing decryption keys to healthcare providers in emergency situations would be advantageous.

SUMMARY OF THE INVENTION

Accordingly, the invention preferably seeks to mitigate, alleviate or eliminate one or more of the above mentioned disadvantages singly or in any combination. In particular, it may be seen as an object of the present invention to provide a method for encrypting and/or decrypting data items such as healthcare documents that solves the above mentioned problems of the prior art.

This object and several other objects are obtained in a first aspect of the invention by providing a method of encrypting a data item having an identifier identifying the data item, the method comprising encrypting, using a symmetric encryption key, the data item to obtain an encrypted data item, and encrypting, using the identifier of the data item as an encryption key, the symmetric encryption key to obtain an encrypted encryption key.

In an aspect of the invention there is provided a method of decrypting an encrypted data item, the encrypted data item being encrypted using an encryption key, the encryption key being encrypted, the method comprising providing a decryption key for decrypting the encrypted encryption key, sing the provided decryption key for decrypting the encrypted encryption key to obtain the encryption key, and using the obtained encryption key for decrypting the encrypted data item to obtain the data item.

The invention is particularly, but not exclusively, advantageous for use in healthcare for protecting patient related healthcare data items such as records, images etc.

In an aspect, the invention relates to a computer program product being adapted to enable a computer system comprising at least one computer having data storage means associated therewith to control the encryption and decryption of data items and the management of the associated keys and licenses. Such a computer program product may be provided on any kind of computer readable medium, e.g. magnetically or optically based medium, or through a computer based network, e.g. the Internet.

The aspects of the present invention may each be combined with any of the other aspects. These and other aspects of the invention will be apparent from and elucidated with reference to the embodiments described hereinafter.

The present invention will now be explained, by way of example only, with reference to the accompanying figures.

The invention uses the concept of identity-based encryption as previously described e.g. in *Identity based encryption from the Weil pairing* by D. Boneh and M. Franklin, SIAM J. of Computing, Vol. 32, No. 3, pp. 586-615, 2003.

In the context of this invention an "emergency agent" is a person, an authority or organization or other body that manages licenses/keys to protected data items. There can be one or more emergency agents. A "healthcare provider" is a person, an authority or organization or other body that provides healthcare to one or more patients or individuals.

Each emergency agent possesses a pair of a master public and master private key pair of an identity based encryption scheme. It is assumed that only one such pair is used throughout the system; however, the invention can be generalized in a straightforward manner to operate with a limited number of such pairs. The emergency agent keeps the secret master key protected. The corresponding public master key is publicly available to all involved parties such as healthcare providers.

Figure 1:
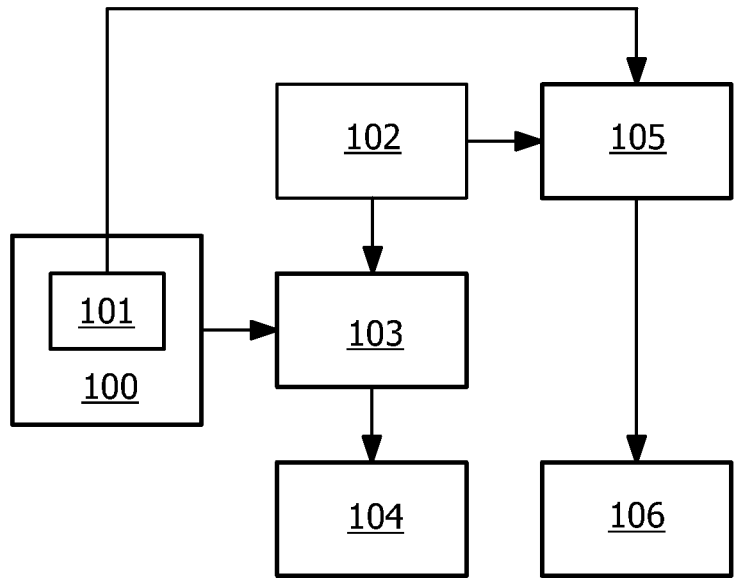
FIG. 1 illustrates schematically the method of encrypting a data item according to the first aspect of the invention.

FIG. 1 shows a data item 100 to be protected by encryption. The data item 100 can be e.g. any data such as a document or an image related to a patient. The data item 100 has an identifier 101 that identifies the data item. The identifier can be e.g. a title of the data item such as a generic or specific title. The data item 100 will first be encrypted in step 103 by a symmetric encryption scheme under a key 102 to obtain the encrypted data item 104. This key 102 is further encrypted in step 105 by the license server under an identity-based encryption scheme with the identifier 101 of the data item 100 as a public key ("identity") and the master public key. This encrypted key 106 is stored as part of the emergency license.

Figure 2:
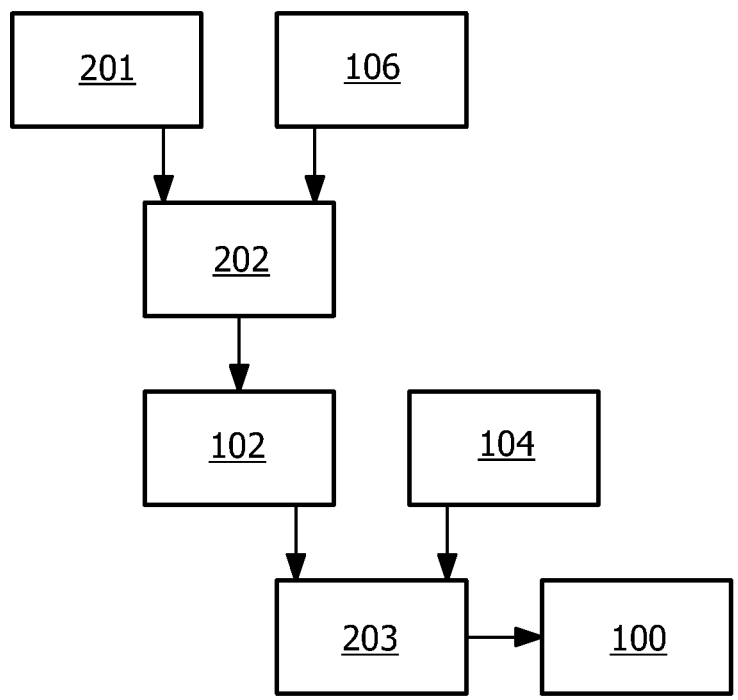
FIG. 2 illustrates schematically the method of decrypting an encrypted data item according to the second aspect of the invention.

FIG. 2 illustrates the steps of the process of decrypting the encrypted data item 104. In case a healthcare provider needs access to one or more encrypted data items 104, or ideally their decrypted equivalents 100, with identifier, he or she contacts an emergency agent, authenticates him or her self and requests a corresponding decryption key for decrypting the requested one or more data items. The emergency agent in turn logs the request, generates the corresponding secret key 201 and submits this key to the healthcare provider. The healthcare provider uses the received key 201 to decrypt, in step 202, the encrypted key 106 contained in the emergency license. In turn the decrypted encryption key 102 can be used in step 203 to decrypt the encrypted data items 104. The requested decrypted data item 100 is hereby available to the healthcare provider.

The emergency agents should log all emergency transactions and perform a periodic review in order to assure the proper use of the emergency scheme. The logged data should contain relevant data such as the identity of the healthcare provider having requested the license; which data items have been requested; which licenses have been issued; date and time, etc.

Note that the use of identity-based cryptography allows using a different key 102 for each data item 100. Thus, if the key 102 is leaked by accident, only the data item 100 is affected; all other data items in the system are still secured. Even if the key is leaked to an unauthorized person who is not compliant he can not use this key to decrypt other documents. Furthermore, the security properties of the identity based encryption scheme assure that the key 102 can only be obtained by interacting with an emergency agent, who in turn should log these events for auditing purposes. The scheme is extremely space efficient, as only the public and secret master keys need to be stored permanently. All other keys (102 and 201) are either generated randomly or computed on the fly from the identifier of the requested document.

Figure 3:
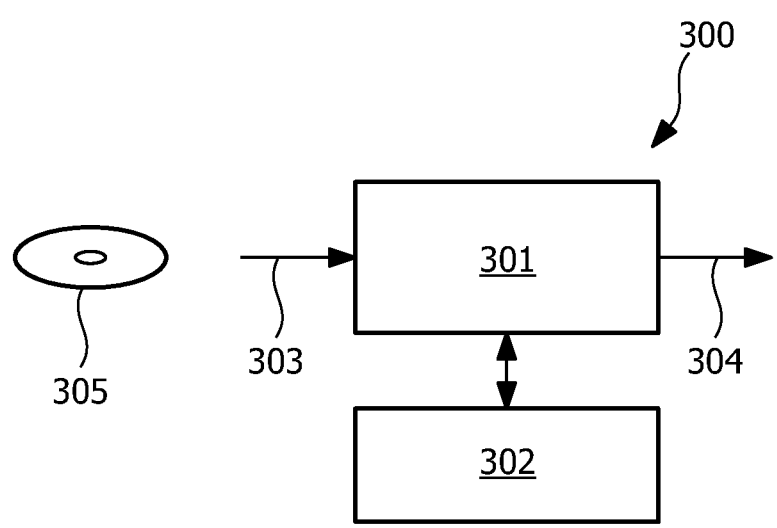
FIG. 3 illustrates a computer system for use with the invention.

FIG. 3 shows a computer system 300 comprising a computer 301 having data storage 302 associated therewith. The computer 301 receives an input 303 and provides an output 304 and is programmed by instructions on a suitable computer program product 305 such as a CDROM to control the encryption and decryption of data items and the management of the associated keys and licenses.

The invention can be implemented in any suitable form including hardware, software, firmware or any combination of these. The invention or some features of the invention can be implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although the present invention has been described in connection with the specified embodiments, it is not intended to be limited to the specific form set forth herein. Rather, the scope of the present invention is limited only by the accompanying claims. In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Furthermore, reference signs in the claims shall not be construed as limiting the scope.

The invention claimed is:

1. A method of encrypting a data item having a public identifier identifying the data item, the method comprising acts of:

encrypting the data item using a symmetric encryption key to obtain an encrypted data item, and encrypting the symmetric encryption key using an identity-based encryption scheme to obtain an encrypted encryption key, wherein the identity-based encryption scheme encrypts the symmetric encryption key with the public identifier as a public key and with a master public key, the master public key being paired with a master private key;

wherein the identity-based encryption scheme combines the public key and the master public key to create an encryption key, the encryption key encrypting the symmetric encryption key.

2. The method according to claim 1, wherein the method further includes:
providing the master public key from an emergency agent facilitating data access to encrypted data during medical emergencies.

3. The method according to claim 1, further including:
generating a decryption key for the encrypted encryption key using the master private key.

4. The method according to claim 1, wherein the master private key is privately maintained by an emergency agent of a healthcare system, the emergency agent facilitating data access to encrypted data during medical emergencies, and wherein and the master public key is publicly available across the healthcare system.

5. The method according to claim 1, wherein the identity-based encryption uses bilinear maps.

6. The method according to claim 1, wherein the public identifier is a title of the data item.

7. A method of decrypting an encrypted data item, the encrypted data item being encrypted using asymmetric encryption key, the symmetric encryption key being encrypted, the method comprising acts of:
generating a decryption key for decrypting the encrypted encryption key using an identity-based encryption scheme, the identity-based encryption scheme generating the decryption key with a combination of a master private key and a public identifier identifying the encrypted data item, the master private key corresponding to a master public key, the master public key combined with the public identifier to encrypt the encrypted encryption key,
using the decryption key for decrypting the encrypted encryption key to obtain the encryption key, and
using the obtained encryption key for decrypting the encrypted data item to obtain the data item.

8. The method according to claim 7, wherein the method further includes:
providing the master public key from an emergency agent facilitating data access to encrypted data during medical emergencies.

9. A method according to claim 7, further comprising:
logging of the decryption key with an emergency agent which: 1) facilitates data access to encrypted data during medical emergencies; and 2) provides the decryption key.

10. A non-transitory computer readable medium carrying software which when implemented on a computer system controls the computer system to perform the steps of:
receiving a master public key from an emergency agent, the master public key being paired with a master private key, and the emergency agent facilitating data access to encrypted data during medical emergencies;
encrypting the data item using a symmetric encryption key to obtain an encrypted data item, and
encrypting the symmetric encryption key using an identity-based encryption scheme to obtain an encrypted encryption key, wherein the identity-based encryption scheme encrypts the symmetric encryption key with a combination of the master public key and a public identifier identifying the data item.

11. A non-transitory computer program product adapted to enable a computer system comprising at least one computer having data storage means associated therewith to perform a method of decrypting an encrypted data item, the method comprising acts of:
providing a decryption key for decrypting an encrypted key from an emergency agent, the emergency agent facilitating data access to encrypted data during medical emergencies, and the decryption key generated from a master private key, the master private key paired with a master public key,
using the provided decryption key for decrypting the encrypted encryption key to obtain a symmetric encryption key, and
using the obtained encryption key for decrypting the encrypted data item to obtain the data item,
wherein the encrypted encryption key has been encrypted using an identity-based encryption scheme, the identity-based encryption scheme encrypting the symmetric encryption key with a public identifier as an encryption key and with the master public key, the public identifier identifying the data item.

12. A computer system comprising at least one computer having data storage means associated therewith, the at least one computer being configured to perform a method of encrypting a data item, the method comprising acts of:
receiving a master public key from an emergency agent, the master public key paired with a master private key, and the emergency agent facilitating data access to encrypted data during medical emergencies;
encrypting the data item using a symmetric encryption key to obtain an encrypted data item, and
encrypting the symmetric encryption key using an identity-based encryption scheme to obtain an encrypted encryption key, wherein the identity-based encryption scheme encrypts the symmetric encryption key with a combination of a public identifier and the master public key, the public identifier identifying the data item, and wherein the master private key is used to generate a decryption key for the encrypted encryption key.

13. A computer system comprising at least one computer having data storage means associated therewith, the at least one computer being configured to perform a method of encrypting a data item, the method comprising acts of:
receiving a decryption key for decrypting an encrypted encryption key, the decryption key generated from a master private key and specific to a public identifier of the encrypted data item, wherein the master private key is paired with a master public key and the public identifier is a title of the encrypted data item,
using the provided decryption key for decrypting the encrypted encryption key to obtain a symmetric encryption key, and
using the obtained encryption key for decrypting the encrypted data item to obtain the data item,
wherein the encrypted encryption key has been encrypted using an identity-based encryption scheme, the identity-based encryption scheme encrypting the symmetric encryption key with a combination of the public identifier and a master public key.

14. The computer system according to claim 13, wherein the master private key is privately maintained by an emergency agent of a healthcare system, the emergency agent facilitating data access to encrypted data during medical emergencies, and wherein and the master public key is publicly available across the healthcare system.

15. A method of digital rights management, DRM, the method comprising acts of:

encrypting, using a symmetric encryption key, a data item having a public identifier identifying the data item, to obtain an encrypted data item, encrypting, the symmetric encryption key using the identity-based encryption scheme and a combination of the public identifier of the data item and a master public key as an encryption key to obtain an encrypted encryption key, receiving a request for a license to be issued to a requester to decrypt the encrypted data item, verifying whether the requester is properly authenticated, generating a decryption key for the encrypted encryption key using a combination of a master private key and the public identifier, the master private key paired with the master public key, providing, if the requester is properly authenticated, a license including the decryption key for decrypting the encrypted encryption key, logging data on the requester and the license, and issuing the license to the requester.

16. The method according to claim 15, wherein the identity-based encryption uses bilinear maps.

17. A non-transitory computer program product adapted to enable a computer system comprising at least one computer having data storage means associated therewith to perform a method of digital rights management, DRM, the method comprising acts of:

encrypting, using a symmetric encryption key, data item having a public identifier identifying the data item, to obtain an encrypted data item, encrypting the symmetric encryption key using an identity-based encryption scheme to obtain an encrypted encryption key, wherein the identity-based encryption scheme encrypts the symmetric encryption key with a combination of a title of the data item and a master public key, receiving a request for a license to be issued to a requester to decrypt the encrypted data item, verifying whether the requester is properly authenticated, generating a decryption key for the encrypted encryption key using a combination of a master private key and the title, the master private key paired with the master public key, providing, if the requester is properly authenticated, a license including a decryption key for decrypting the encrypted encryption key, logging data on the requester and the license, and issuing the license to the requester.

18. A non-transitory computer program product according to claim 17, wherein the method further includes:

providing the master public key from an emergency agent facilitating data access to encrypted data during medical emergencies.

19. A computer system comprising at least one computer having data storage means associated therewith, the at least one computer being configured to perform a method of digital rights management, the method comprising acts of:

receiving a master public key from an emergency agent, the master public key paired with a master private key, and the emergency agent facilitating data access to encrypted data during medical emergencies;

encrypting, using a symmetric encryption key, data item having a public identifier identifying the data item, to obtain an encrypted data item, encrypting the symmetric encryption key using an identity-based encryption scheme to obtain an encrypted encryption key, wherein the identity-based encryption scheme encrypts the symmetric encryption key with a combination of the public identifier and the master public key as an encryption key, receiving a request for a license to be issued to a requester to decrypt the encrypted data item, verifying whether the requester is properly authenticated, providing, if the requester is properly authenticated, a license including a decryption key for decrypting the encrypted encryption key, logging data on the requester and the license, and issuing the license to the requester.

20. The method according to claim 19, further including:

generating the decryption key for the encrypted encryption key using a combination of a master private key and the public identifier, the master private key paired with the master public key.

* * * * *